(12) United States Patent
Wang et al.

(10) Patent No.: US 12,737,223 B2
(45) Date of Patent: Sep. 15, 2026

(54) CONCURRENT CONTROL FOR SHARE QUOTA FOR STRICT LIMITS IN REALTIME CHARGING

(71) Applicant: HEWLETT PACKARD ENTERPRISE DEVELOPMENT LP, Spring, TX (US)

(72) Inventors: Bo Wang, Shanghai (CN); Jian-Hua Yang, Shanghai (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 413 days.

(21) Appl. No.: 18/492,512

(22) Filed: Oct. 23, 2023

(65) Prior Publication Data

US 2025/0130855 A1 Apr. 24, 2025

(51) Int. Cl.
*G06F 9/50* (2006.01)
*H04L 12/14* (2006.01)

(52) U.S. Cl.
CPC ........ *G06F 9/5011* (2013.01); *H04L 12/1403* (2013.01)

(58) Field of Classification Search
CPC .............. G06F 9/5011; H04L 12/1403; H04M 15/765; H04M 15/7652; H04M 15/775;
(Continued)

(56) References Cited

U.S. PATENT DOCUMENTS 9,461,829 B2 10/2016 Törnkvist et al.
9,576,307 B2 2/2017 Cassel
(Continued)

FOREIGN PATENT DOCUMENTS

EP 4009673 A1 6/2022
WO 2010/105528 A1 9/2010
(Continued)

OTHER PUBLICATIONS

Oracle, "How to Increase the Maximum No. of Concurrent Sessions for a Batch of Subscribers (Doc ID 1385991.1)", available online at <https://web.archive.org/web/20201202105906/https://support.oracle.com/knowledge/More%20Applications%20and%20Technologies/1385991_1.html>, Dec. 2, 2020, 2 pages.

*Primary Examiner* — Dong U Kim
(74) *Attorney, Agent, or Firm* — Sheppard Mullin Richter & Hampton LLP

(57) ABSTRACT

Systems and methods are provided for concurrent resource sharing amongst concurrent sessions over a network. Examples include receiving, from a first requesting device for a first session of a shared resource plan, a request for a first resource request amount and reserving a first reserved resource amount from a resource quota of the shared resource plan based on the first resource amount A termination message is received, from a second requesting device, for terminating a second session. The termination message includes a resource usage amount to be committed from the resource quota. Based on determination that the resource quota is exhausted based on at least the first reserved resource amount, at least a portion of the first reserved resource amount is allocated to the resource usage amount, and the shared resource plan is updated to reflect the allocation. Said allocating and said updating provides for exhausting the resource quota.

20 Claims, 5 Drawing Sheets

(58) Field of Classification Search
CPC . H04M 15/78; H04M 15/785; H04M 15/8228
See application file for complete search history.

(56) References Cited

U.S. PATENT DOCUMENTS

| | | | | |
|---|---|---|---|---|
| 9,699,038 | B2 | 7/2017 | Larsson et al. | |
| 10,205,832 | B2 | 2/2019 | Chai | |
| 10,846,671 | B2 | 11/2020 | Qing et al. | |
| 2016/0373590 | A1* | 12/2016 | Oltmanns | H04M 15/785 |
| 2019/0141493 | A1* | 5/2019 | Törnkvist | H04M 15/66 |
| 2019/0392150 | A1* | 12/2019 | Shevade | G06F 9/5072 |
| 2020/0044983 | A1* | 2/2020 | Zheng | H04L 47/801 |
| 2021/0152488 | A1* | 5/2021 | Dey | H04M 15/8016 |
| 2021/0377814 | A1* | 12/2021 | Sillanpaa | H04W 72/04 |
| 2022/0272503 | A1 | 8/2022 | Chai | |
| 2022/0350506 | A1* | 11/2022 | Gafni | G06F 3/067 |

FOREIGN PATENT DOCUMENTS

| | | | |
|---|---|---|---|
| WO | 2021/262059 | A1 | 12/2021 |
| WO | 2022/028076 | A1 | 2/2022 |

* cited by examiner

CONCURRENT CONTROL FOR SHARE QUOTA FOR STRICT LIMITS IN REALTIME CHARGING

BACKGROUND

Network service providers can offer a variety of different services to network service subscribers. Resource plans offered by service providers can be characterized by various resource amounts for using services. For example, a subscriber may pay a monthly fee for a resource plan with a bandwidth speed for using services, a resource amount (or quota) allotted to the subscriber for using services, and/or a quality of service (QoS) level for using services. Similarly, another subscriber may subscribe to a different resources plan with a different bandwidth speed, different resource quota allocation, and/or a different QoS level.

Sometimes, a resource plan can be shared by multiple subscribers and/or across multiple devices. For example, a family share data plan can allow multiple devices to share an allotment of resources (e.g., 20 gigabytes) per month. In another example, multiple devices attributed to a single user may share an allotment of resources. In some cases, once the allotment of resources is consumed, the service provide may charge an account of the user according to a rate attributed to the resource plan. These charges may be deducted from a balance on the account. In these examples, as with most resource plans, a service provider typically suspends the subscribers' service once the resource allotment is consumed, and the balance on the account is exhausted.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
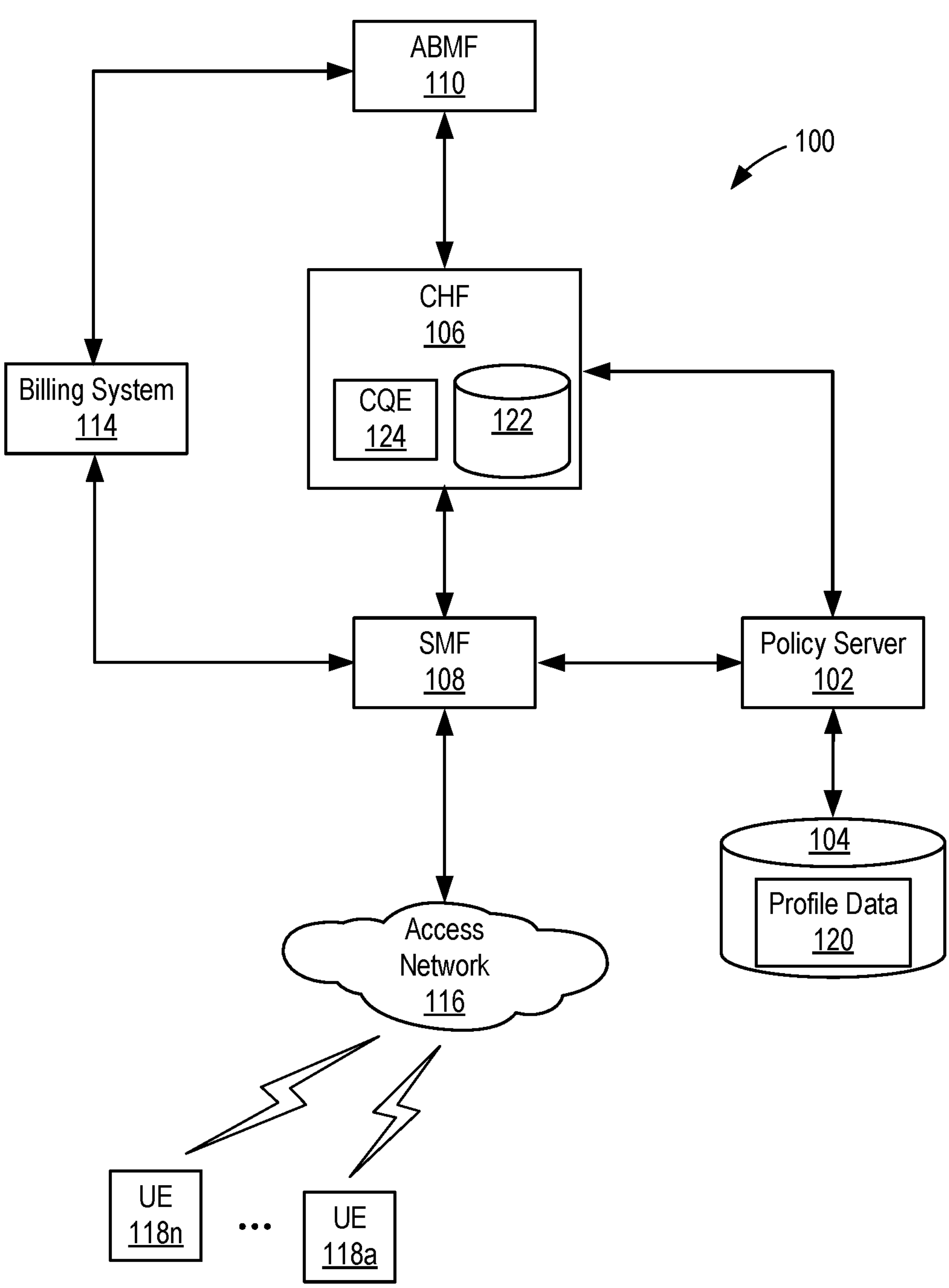
FIG. 1 depicts a schematic block diagram of an example communication environment 100 in which the technology of the present disclosure can be implemented.

The figures are not exhaustive and do not limit the present disclosure to the precise form disclosed.

DETAILED DESCRIPTION

The present disclosure provides for concurrent sharing of resources, according to a resource plan, that ensures the resources of the resource plan are optimally allocated amongst multiple concurrent sessions over a network. Examples disclosed herein detect concurrent sessions requesting resources from a resource plan shared between the concurrent sessions. When one of the concurrent sessions is completed, the implementations disclosed herein can shift resources that are reserved for an ongoing session to the completed session, which ensure that the resources are optimally allocated and exhausted among the concurrent sessions. As a result, the share resource plan can be concurrently utilized by any number of concurrent sessions, even where certain resources have been reserved for other sessions on the shared resource plan.

A "sessions" as used herein refers to an exchange of information or data between an two devices communicating over a network. Sessions may include a session initiation and a session termination that indicate the start and end of a respective session. A session may be considered "concurrent" with another one or more sessions in a case where the sessions are simultaneously active or on going and have not yet been terminated.

Conventionally, online charging functions and account balance management functions utilize reservation and commit modes to ensure a subscriber's account provides coverage for requested services prior to initiation of that service.

Resource plans can include an allotment of resources that can be utilized for providing services. Two examples of such resource allotments include, but are not limited to, a credit balance and a service resource quota. The service resource quota (or resource quota) can be measured by a resource unit type (e.g., volume for data services such as megabytes (MB) or gigabytes (GB), volume of voice servers (e.g., 1000 minutes), volume of SMS/MMS messages (e.g., 1000 texts), etc.) for a defined period of time (e.g., one month, six months, a year, etc.). An example resource quota may be provided as 5 MB for one month. In most of cases, once the resource quota is exhausted, the subscriber pay a charging rate (e.g., $0.5/MB, $0.01/min, etc.), with the cost deducted from the credit balance. For example, a subscriber may pay a monthly fee for a resource plan for accessing services on a network. The resource plan may include monthly resource quotas of 10 GB of data resources and 100 minutes of voice resource. In this example, once the resource quota for data resource is exhausted costs may be deducted from a credit balance at a rate of $0.5 per MB over 10GM, and costs may be deducted from a rate of $0.01 per minute over 100 minutes once the resource quota for voice resource is exhausted. The credit balance may need to be charged by the subscriber, otherwise the services will be blocked if the credit balance is exhausted.

Conventional reservation and commit mode are serialized usage sessions, with real time online charging control, so that remaining balance of a resource quota can cover a requested service, or charge a credit balance if the resource quota is exhausted. For example, resources from a resource quota may be reserved at the start of a session, and committed once the session is terminated. However, if the resource quota is shared by multiple concurrent sessions, concurrent sessions can overlap in requests and usage and can complicate the conventional reservation/commit modes producing unexpected results.

As an illustrative example, in certain conventional systems, a first session may be initiated under a service plan that requests reservation of an amount of the resource quota, resulting in the amount of resource quota being reserved for the first session. Then a second session may be initiated under the same service plan, resulting in concurrent sessions on the shared service plan since the first session is not yet terminated. The second session requests an amount of resource quota. Where the amount of resource quota reserved for the first session exhausts the resource quota, the second session results in reserving an amount from the credit balance according to the requested amount and the rate of the service plan. In a case where the second session is terminated prior to the first session, the amount reserved from the credit balance is committed to the second session, which results in charging of the credit balance. When the first session is terminated at some time later, if the actual usage amount is less than the reserved amount, the actual usage amount of resource quota is committed to the first session. However, the difference between the amount reserved for the first session and the actual usage remains unused in the resource quota. Thus, in this example, the balance of resource quota may go unused even though the subscriber was charged due to actual usage during the second session, which is an unexpected result in the eyes of the subscriber.

The above result is unexpected results in complications and services delays on the service provider side as the service provider may be required to correct the result. For example, the subscriber may present the unexpected result to the service provider and who may have to update the subscribers plan to reflect correct resource quota usage. This may include reconciling of the balances and offline re-rating of the resource usage, which may include refunding credit to the credit balance.

The present disclosure provides for systems and methods that avoid this complication and ensures that the entire resource quota balance is exhausted before charging the credit balance. The present disclosure receives, for a first session, a first network resource quota request requesting a first resource request amount from a shared resource plan and reserves the first resource amount for the first network resource quota request (referred to as a first reserved resource amount). The shared resource plan defines a resource quota, account balance amount, and a charging rate for when the resource quota is exhausted.

After receiving the first network resource quota request, a second network resource quota request is received, for a second session, which requests a second resource request amount from a shared resource plan. If the first reserved resource amount does not exhaust the resource quota, a second reserve amount is reserved from the second network resource quota request. Where the resource quota is exhausted, either by the first reserved resource amount alone or in combination with the second reserved resource amount, a second charged amount is reserved from the account balance based on the remainder of the second resource request amount and the charge rate, which reduces the account balance.

At some point later, a session termination message is received for the second session, which includes a second resource usage amount. The second resource usage amount sets forth the amount of services actually consumed during the second session (which may be more or less than the second reserved resource amount).

If the resource quota is exhausted, as is the case above, the first reserved resource amount and second reserved resource amount (if any) are queried and stored as a first context. A second context is created that temporarily sets all reserved amounts to zero (0). The second reserved resource amount from the first context is used to commit the second reserved resource amount in second context, and reduce the balance of the resource quota and charge the account balance (if necessary). Next, the first reserved resource amount from the first context is applied to the second context, which commits any remaining resource quota and charges the account balance according to the remainder of the first reserved resource amount from the first context. The account balance and resource quotas are then updated using the second context, which updates resource quota reservations, committed services, and account balances.

At some point later, a session termination message can be received for the first session, which includes a first resource usage amount. Any remaining resource quota can be committed and the account balance can be charged according to the first resource usage amount since the resource quota amount is exhausted by the second resource usage amount alone, or in combination with, a portion of the first resource usage amount.

As a result, the resource quota can be utilized by any concurrent session, prior to charging an account balance, even where certain resource quota is already reserved for other sessions.

It should be noted that the terms "optimize," "optimal" and the like as used herein can be used to mean making or achieving performance, as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

FIG. 1 depicts a schematic block diagram of an example communication environment 100, in which the technology of the present disclosure can be implemented.

Communications environment 100 may represent one or more communications networks for providing various services, such as, but not limited to, data, voice, texts (e.g., SMS, MMS, or the like), etc.

Communications environment 100 may include a policy server 102, a user data repository (UDR) 104, an Charging Function (CHF) 106, a Session Management Function 108, an Account Balance Management Function (ABMF) 110, a Rating Function (RF) 112, and a billing system 114. Communications environment 100 may include an access network 116 that communicatively connects SMF 108 to a plurality of user equipment (UE) devices 118*a*-118*n* (collectively referred to herein as UE devices 118). The UE devices may be associated with resource plan for a subscriber. Each UE device 118 may represent a computer or device (e.g., a mobile smart phone, a tablet computer device, a personal digital assistant (PDA), vehicle, wearable smart device, internet-of-things (IoT) device, etc.) that are capable of connecting to network nodes in communications environment 100 via access network 116, and/or may be capable of connecting to the internet (e.g., via SMF 108), or receiving services or data using the communications environment 100. UE devices 118 may be capable of requesting establishment of one or more sessions over the access network 116 for receiving services according to a resource plan.

CHF 106 may be any suitable entity or entities (e.g., one or more computing platforms or software executing on at least one processor) for performing one or more charging functions. For example, CHF 106 may process or handle resource quota requests for different sessions. In this example, CHF 106 may handle network resource quota requests from UE devices 118 for different sessions of a same shared resources plan, e.g., a family data sharing plan, multiple devices of a shared plan, etc.

A shared resources plan may allow a number of sessions to share or use communications network related resources from a plan's total resources amount (e.g., a total monthly allotment). For example, shared resources may involve a data amount (e.g., 5 gigabytes (GB)), a time amount (e.g., 100 minutes of voice), a count amount (e.g., 500 text message), and/or a credit amount (e.g., $100). The resource may be shared over a number of sessions initiated by one or more UE devices 118.

In some embodiments, CHF 106 may receive resource usage data (e.g., traffic and signaling data generated or received by UE devices 118) from SMF 108 and/or another entity of communications environment 100. CHF 106 may be configured to maintain a session usage database 122 to record and store the resource usage data for various sessions and subscribers received from SMF 108. In some embodiments, CHF 106 may be configured to utilize session usage database 122 to distinguish and keep track of specific resource usage for each subscriber.

In some embodiments, CHF 106 may include functionality (e.g., one or more modules) for utilizing concurrent resource sharing algorithm or various aspects described herein. For example, CHF 106 may include a concurrent quota engine (CQE) 124 configured to receive a service quota request related to a member of a shared resources plan and, in response, reserve resources from the resource quota of the shared resource plan. In a case where the requested resource amount exceeds the resource quota, CQE 124 can be configured to exhaust the resource quota (if any remains) in reserving resources from the resource quota and reserve a credit amount from a credit balance of the shared resource plan according to a rate. CQE 124 may also be configured to receive a resource usage amount (e.g., an actual amount of resources consumed during the session) when a session is terminated by a member of the service plan, and, upon receiving the resource usage amount, commit an amount of the reserved resource quota to the session and/or reserved credit amount. CQE 124 can also release and/or relinquish any remaining reserved resources, and/or credit not committed to the resource usage amount.

SMF 108 may represent any suitable entity in communications environment 100 configured to receive communications from UE device 118 via access network 116 as well as reporting the usage associated with UE device 118 to CHF 106. SMF 108 may also be configured to execute or enforce the policy rules provided by policy server 102. The SMF 108 can be configured to manage the sessions on the network. SMF 108 may provide for session establishment, modification and termination of sessions, and allocation of IP addresses for sessions. The SMF 108 can communicate indirectly with the UE devices 118 through an Access and Mobility Management Function (AMF) of access network 116 (not shown) that relays session-related messages between the devices and the SMF 108. In some embodiments, SMF 108 may include any network element configured to support or host at least one of a policy control function (PCF), policy charging rules function (PCRF), or any other like network element function.

In some examples, SMF 108 may be configured for requesting and enforcing resource quota for various subscribers. For example, when a subscriber or related UE device 118 connects to access network 116 or communications environment 100 to initiate a session, SMF 108 may send a resource quota request to CHF 106 for requesting an amount of resource quota (referred to herein as a resource request amount) for use during the session. In this example, the CHF 106 may reserve the requested amount of resources for use, during the session. When the subscriber or UE device 118 terminates the session, SMF 108 may send a resource usage amount to the CHF 106 including of an actual amount of resources consumed during the sessions. The CHF 106 may then commit the amount of resources actually consumed during the session, to the session, and release or relinquish any remaining reversed amount back to the resource quota.

ABMF 110 may be any suitable entity or entities (e.g., one or more computing platforms or software executing on at least one processor) for performing management of credit amount balance of subscribers. In some cases, ABMF 110 may process or handle deducting reserved credit amounts, from a credit balance of the shared resource plan. For example, where the resource quota is exhausted and the CHF 106 reserves a credit amount, the ABMF 110 may deduct the reserved credit amount from the credit balance of the shared service plan. Thus, future reservations can be made against a real time credit amount. ABMF 110 may also process or handle crediting uncommitted reserves to the credit balance, for example, where the resource usage amount is less than reserved amount. In this case, an uncommitted credit amount may exist that can be credited back to the credit balance by ABMF 110.

Billing system 114 may represent any suitable entity in communications environment 100 configured to perform one or more billing and/or charging functions. In some embodiments, billing system 114 may be used to compute or compile resource usage for billing purposes and/or for providing interfaces for allowing subscribers to pay bills or purchases additional resources. For example, billing system 114 may provide a user interface or other communications interface for allowing a subscriber to top off, or purchase, additional resources for a shared resources plan. In this example, once the subscriber has completed a transaction to purchase resources for the shared resources plan, billing system 114 may notify CHF 106 such that these resources can be utilized, e.g., by one or more members of the shared resources plan.

Policy server 102 may represent any suitable entity for performing one or more policy functions and/or charging functions. For example, policy server 102 may be configured to determine and create policy rules for subscribers that subscribe to services in communications environment 100. In this example, policy server 102 may generate policy control function (PCF) rules and provide the rules to one or more network elements (e.g., SMF 108). Continuing with this example, the PCF rules created by policy server 102 may pertain to services, QoS levels, and charging rules associated with resource plans.

In some embodiments, policy server 102 may include a policy and charging rules function (PCRF) and/or may be hosted and executed by a Diameter-based network element or server.

In some embodiments, policy server 102 or another entity may be configured to request quota usage information from CHF 106. The quota usage information may be requested and received via an application interface with CHF 106. In some embodiments, policy server 102 may request the quota usage information from CHF 106 by sending a Diameter Protocol based request message that may include at least one of Diameter session identifier information, subscriber identifier information (e.g., IMSI), subscriber tier information, subscriber service type identifier information, and/or other information. Upon receiving the request, CHF 106 may be configured to use the provided information to determine the appropriate resource quota usage information, which may be ultimately returned to requesting policy server 102.

UDR 104 may include a database configured to store profile information pertaining to subscribers of communications environment 100, and associated resource plans. For example, the stored subscriber profile data may include subscriber identifier information in association with a resource plan code (e.g., a billing plan code or name) and the entitlements associated with the resources plan code. The resource plan code may be associated with resource plan data that define resource allocations, such as resource quotas and charging rates for the related resource plan. Exemplary entitlements include, but are not limited to, voice over Internet protocol (VoIP) service, video chat, domestic roaming, international roaming, MiFi, data, gifts (e.g., special promotions), and specific equipment. In some embodiments, UDR 104 may be integrated with one or more network elements or may be distributed across multiple computing platforms or devices.

UE device 118 may register for services with a communications network by initiating a network attachment procedure. For example, UE device 118 can send a user attach request message to SMF 108. In response to receiving the attachment request message, SMF 108 may send a Diameter credit control request (CCR) message to policy server 102. Policy server 102 may then send a Diameter user-data-request (UDR) message containing a user identifier to UDR 104 to request a resources plan code and/or plan entitlements associated with the subscriber. For example, UDR 104 may be configured to store resource plan data in a local profile database 120. Alternatively, UDR 104 may query an external database containing the subscriber's resources plan information.

CHF 106 may be configured to interface with the UDR 104 via policy server 102 to reserve and commit resource quota. For example, as described above, CQE 124 can be configured to reserve a resource amount from the resource quota of the shared resource plan. The UDR 104 may hold the available resource quota in local profile database 120 as part of the resources plan data. CHF 106 may retrieve the resource quota from UDR 104 and reserve a portion of the resource quota according to the reserve resource amount by deducting the reserve resource amount from the resource quota. Subsequently, upon committing an amount of the reserved resource amount, CHF 106 may update the resource quota held in the UDR 104 by releasing the unused reserved resource amount back to the resource quota.

It will be appreciated that FIG. 1 is for illustrative purposes and that various nodes and/or modules, locations, and/or functionality described above in relation to FIG. 1 may be changed, altered, added, or removed. For example, FIG. 1 depicts various functions of a 5G Core Network. However, the present disclosure can be implemented in other networks, such as but not limited to, a 4G LTE Core Network, 3G Core Network, and the like. In the case of a 4G LTE Core Network certain functionality are provided by differing devices. For example, the functionality of SMF 108 described above may be performed by a packet data network (PDN) gateway (PGW); functionality performed by the UDR 104 may be performed by a subscriber profile repository (SPR); and functionality performed by the CHF 106 can be performed by an online charging function (OCF).

Figure 2:
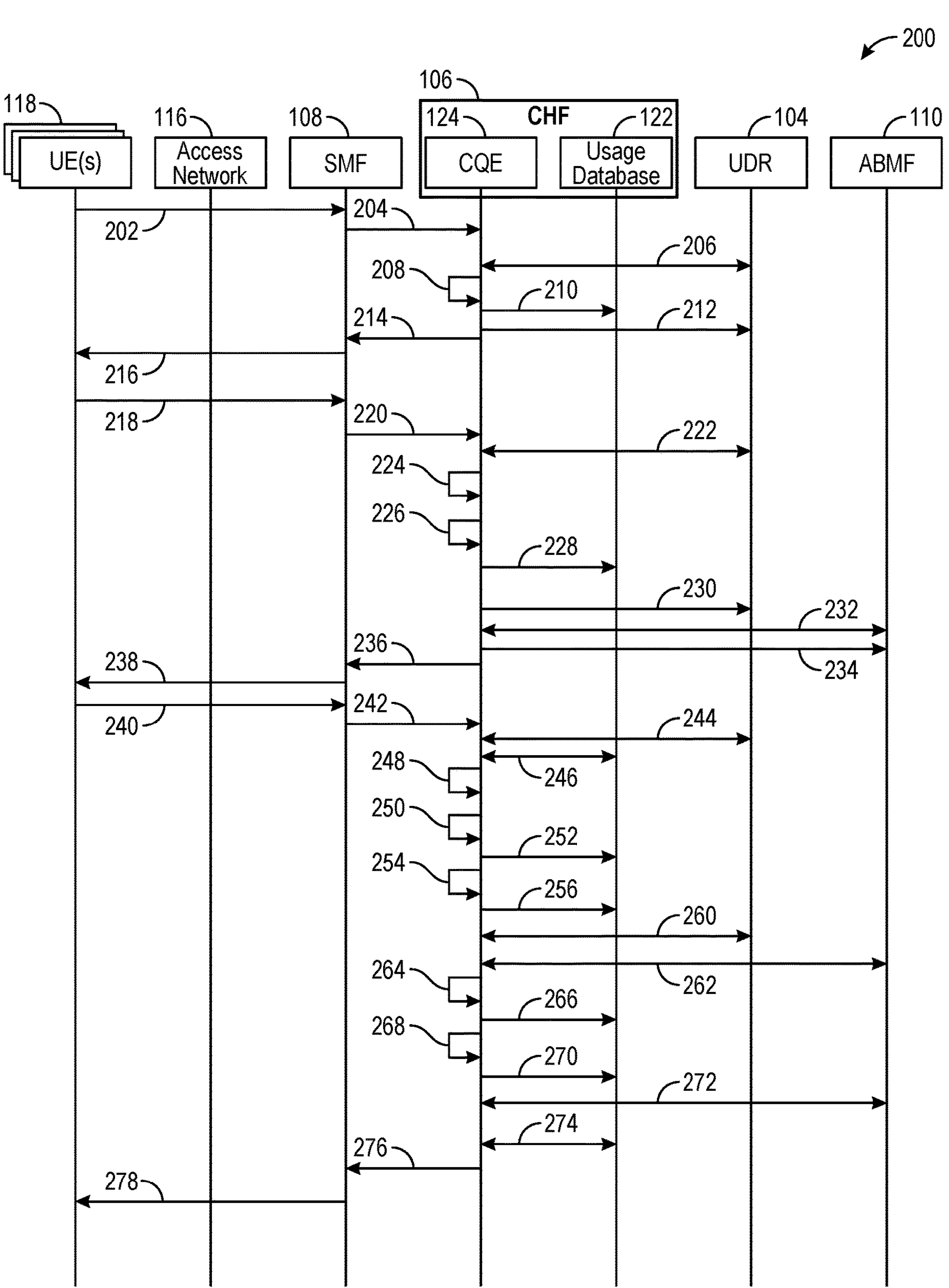
FIG. 2 depicts an example message flow diagram reflecting operations performed for concurrent resource sharing in accordance with the implementations disclosed herein.

FIG. 2 depicts an example message flow diagram, reflecting operations performed for concurrent resource sharing, in accordance with the implementations disclosed herein. FIG. 2 depicts a message flow 200 implemented over the environment 100, and thus description of message flow 200 is made with reference to elements of FIG. 1.

A UE device 118 sends a first session establishment request message 202 to the SMF 108 via access network 116. During session establishment, the SMF 108 may interact with the PCF and the profile data stored within the UDR 104 to establish the session. The first session establishment request message 202 may include information, such as, but not limited to, the subscriber identifier information (e.g., IMSI), a type of service for which the session is requested (e.g., data, voice, text, etc.), and an amount of network resources estimated to be consumed during the requested session.

Thereafter, the SMF 108 sends a first resource quota request message 204 to the CHF 106. The message 204 may include the subscriber identifier information and a first resource request amount for the requested first session. The CHF 106, through CQE 124 queries the UDR 104 at information exchange messages 206 to access local profile database 120 and retrieve profile data for the subscriber identifier information included in message 204. UDR 104 returns profile data, such as the resource plan data corresponding to the subscriber identifier information. The resource plan includes the available resource quotas (e.g., maximum quota or remaining quota in the case of a prior terminated session consumed some quota) and charging rates according to the resource plan for the subscriber identifier information.

At operation 208, the CQE 124 determines if resource quota is available based on the resource plan data received at information exchange messages 206 and the first resource request amount. If there is sufficient resource quota available to cover the first resource request amount, CQE 124 reserves the first resource request amount as first reserved resource amount at operation 208 and registers the reservation in the session usage database 122 through message 210. For example, CQE 124 may log the first session in the usage database, including subscriber identifier information, service type, first reserved resource amount, resource quota (e.g., remaining resource quota), and other information in a first context that is stored in usage database 122. The first context may be associated with the subscriber identifier information.

As used herein, a "context" (also referred to as a "programming context") may refer to a minimal set of data used by a function, engine, or module to perform a task that is saved as an associated group. A context can be defined as all the relevant information that a function, engine, or module needs to complete a task.

The CQE 124 also updates the resource quota of the resource plan at the UDR 104 through message 212. Updating the resource plan can include deducting the first reserved resource amount from the available resource quota.

In some implementations, message 204 may include information identifying the service type for which the first session is requested. In this case, operation 208 may include determining the service type for the first session and retrieving the resource quota for that service type in the resource plan. In this way, multiple resource quotas can be allocated to corresponding service types. The multiple resource quotas can be logged in the first context via message 210 and updated at the UDR 104 via UDR 104.

Following reserving the first resource quota amount, CHF 106 may transmit a first resource request answer 214 to SMF 108. The first resource request answer 214 confirms with the SMF 108 that resources have been reserved for the first session. Based on first resource request answer 214, SMF 108 establishes the requested first session and issues a first session establishment success message 216.

At some point later, prior to termination of the first session established by messages 202-216, a UE device 118 sends a second session establishment request message 218 to the SMF 108 via access network 116. The UE device 118 may be the same UE device 118 that requested the first session or a different UE device 118. The second session may be requested for a different application on the same UE device 118 (e.g., first session may requested to watch a video on UE device 118, while the second session may requested be to play audio on the same or different UE device 118). As another example, one application may be for downloading Internet content, while a second session may be for VoIP and/or video conference applications.

In any case, the same or a different UE device 118 requests the second session and SMF 108 may interact with the PCF and the profile data stored within the UDR 104 to establish the session. The second session establishment request message 218 may include information, such as, but not limited to, the subscriber identifier information (e.g., IMSI), a type of service for which the session is requested (e.g., data, voice, text, etc.), and an amount of network resources estimated to be consumed during the requested session.

Thereafter, the SMF 108 sends a second resource quota request 220 to the CHF 106. The message 220 may include the subscriber identifier information, a second resource request amount for the requested second session, and a service type for the second session. The CHF 106, through CQE 124 queries the UDR 104 at information exchange messages 222 to access local profile database 120 and retrieve profile data for the subscriber identifier information included in message 220. UDR 104 returns profile data, such as the resource plan data corresponding to the subscriber identifier information. The resource plan includes the available resource quotas (e.g., maximum quota or remaining quota in the case of a prior terminated session consumed some quota) and charging rates according to the resource plan for the subscriber identifier information.

At operation 224, the CQE 124 determines if resource quota is available based on the resource plan data received at information exchange messages 206 and the second resource request amount from message 220. If there is sufficient resource quota available to cover the second resource request amount, CQE 124 reserves the second resource request amount as second reserved resource amount at operation 224 and proceeds with establishing the session in a manner similar to the first session.

Whereas, if the resource quota is exhausted, either by the first resource request amount or a portion of the second resource request amount, CQE 124 performs operation 226 to rate the second resource request amount. If any resource quota remains available at operation 224, operation 226 may include reserving some of the second resource request amount as second reserved resource amount, until the resource quota is exhausted. Operation 226 can also include applying the charge rate received from UDR 104 to the remainder of the second resource request amount to determine a second credit amount.

Once the reservations are determined at operation 226, CHF 106 registers the reservations in the session usage database 122 through message 228. In this example, the subscriber identifier information included in message 220 is the same as the subscriber identifier information from message 204. As such, CQE 124 registers the reservation in the session usage database 122, for example, by logging the second session in the first context on the session usage database 122. As with message 210, message 228 may include subscriber identifier information, service type, second reserved resource amount, resource quota (e.g., remaining resource quota), and other information in a first context that is stored in usage database 122, along with the second credit amount.

If any resource quota was reserved based on the second resource request amount, CQE 124 updates the resource quota of the resource plan at the UDR 104 through message 230. Additionally, in this example, the CQE 124 queries the ABMF 110 to retrieve a credit balance for the subscriber identifier information at information exchange messages 232. If the balance is sufficient to cover the second credit amount, the CQE 124 updates the credit balance at the ABMF 110 through message 234.

Following messages 232 and 234, CHF 106 may transmit a second resource request answer 236 to SMF 108. The second resource request answer 236 confirms with the SMF 108 that resources have been reserved for the second session. Based on second resource request answer 236, SMF 108 establishes the requested first session and issues a first session establishment success message 238.

At some point later, UE device 118 sends a termination request message 240 to SMF 108 to terminate the second session. The termination request message 240 may include a resource usage amount that includes information indicating an amount of resource actually consumed during the second session. Termination request message 240 may also the subscriber identifier information (e.g., IMSI) and other information as needed to terminate the second session. Thereafter, the SMF 108 forwards the resource usage amount and the subscriber identifier information to the CHF 106 in a termination request message 242.

Responsive to the termination request message 242, the CQE 124 queries the UDR 104 to retrieve the resource plan for the subscriber identifier information included in termination request message 242 through information exchange messages 244. CQE 124 receives the resource data, including any services quotas (e.g., available resource quotas). CQE 124 also queries the session usage database 122 through information exchange messages 246 to retrieve session usage information for the subscriber identifier information included in termination request message 242. In this example, CQE 124 accesses the first context corresponding to the subscriber identifier information.

Using the first context, CQE 124 determines if there are any concurrent sessions for the subscriber identifier information at operation 248. For example, as described above, first context holds usage data for the first session and the second session. This context includes information indicating that the first session remains on going (e.g., established), and is thus considered by CQE 124 as concurrent with the second session. Once concurrent sessions are recognized, CQE 124 also determines if the resource usage amount can be covered by the second reserved resource amount (e.g., is resource usage amount less than the second reserved resource amount). If so, an amount of the second reserved resource amount is committed to the resource usage amount, the resource quota is updated by releasing any uncommitted amount of the second reserved resource amount, the credit balance is updated by releasing the second credit amount, and the second session is terminated. In this case, the second session is complete and have consumed resources without charging the credit balance.

However, if the second reserved resource amount cannot cover, the resource usage amount can be covered, the CQE 124 then executes concurrent resource sharing logic that includes, at least, messages 250-256. At operation 250, CQE 124 creates a second context as a clone of the first context and registers the second context to session usage database 122 via message 252. The second context is identical to the first context, including all information contained with the first context. Operation 250 may also include setting all resource quota reservations to zero (e.g., all resource quota reservations and credit balance reservations). For example, in the above example, the first reserved resource amount, second reserved resource amount, and second credit amount may be set to zero, thereby reflecting maximum resource quota and credit balance available in the second context. Interim resource quotas are set to maximum available quota.

Using the second context, CQE 124 rates the resource usage amount at operation 254 on the interim resource quota. For example, operation 254 reserves the resource usage amount as an interim second reserved resource amount and registers the reservation in the second context on the session usage database 122 using message 256. The CQE 124 applies the interim second reserved resource amount to an interim resource quota, thereby reducing the interim resource quota of the second context accordingly. At this time, if the interim second reserved resource amount (e.g., resource usage amount) exhausts the interim resource quota, operation 254 can also apply the charging rate to the remainder of the resource usage amount, and register the reservation as an interim second credit amount.

The CQE 124 uses the interim second reserved resource amount to commit resources to the usage service amount of the second session. For example, CQE 124 issues message 260 to the UDR 104 to commit the interim second reserved resource amount to the resource usage amount. The committed amount of resources is deducted from the resource quota stored at the UDR 104. If an interim second credit amount is greater than 0, then CQE 124 issues message 262 to the ABMF 110, to reserve the interim second credit amount by deducting the interim second credit amount from the credit balance.

At operation 264, CQE 124 updates the reservations for the first session in the second context and registers the updated context to session usage database 122 via message 266. For example, CQE 124 may locate the reservations for the first session from the session usage database 122 (e.g., from the first context) and set the reservations in the second context to the reservations from the first context. In this case, the second context may be updated to update an interim first resource request amount (set to 0 at operation 250) in the second context to the first resource request amount.

At operation 268, CQE 124 rates the interim first resource request amount in the second context against the interim resource quota. For example, CQE 124 checks the available interim resource quota and, if any interim resource quota is available, CQE 124 will reserve the available resource quota as interim first reserved resource amount. If the interim resource quota is exhausted by the interim first resource request amount, (or by the second interim resource request amount), operation 226 may include applying the charge rate to the remainder of the first interim resource request amount to determine an interim first credit amount.

Once the interim reservations for the first session are determined at operation 268, CHF 106 registers the reservations in the session usage database 122 through message 270. In one example, the interim reservations for the first session are to register to the second context and the first context is then deleted, such that the second context will be used for future sessions. In another example, second context, updated with the interim reservations for the second sessions, is used to update the first context for use in future processing.

CQE 124 then transmits message 272 to update the credit balance at the ABMF 110. For example, the interim second credit amount is used to commit a portion of the credit balance to the second session, while the interim first credit amount sets a reservation on a portion of the credit balance for the first session.

If the credit balance is able to cover the committed and reserved credit amounts from message 272, then CQE 124 sends a termination message 274 to session usage database 122, which registers the second session as terminated. Session usage database 122 confirms the termination, and CQE 124 issues a termination confirmation message 276 to SMF 108 confirming that the session can be terminated. SMF 108 issues a termination answer message 278 to the UE device 118 confirming the second session is terminated. In the event that the credit balance is unable to cover the reservations and committed amounts, CHF 106 issue an alert of insufficient credit balance and require additional funds in order to provide further services under the resource plan. In this case, the subscriber may be notified through, for example, termination answer message 278 or another means (e.g., text, email, etc.).

Figure 3:
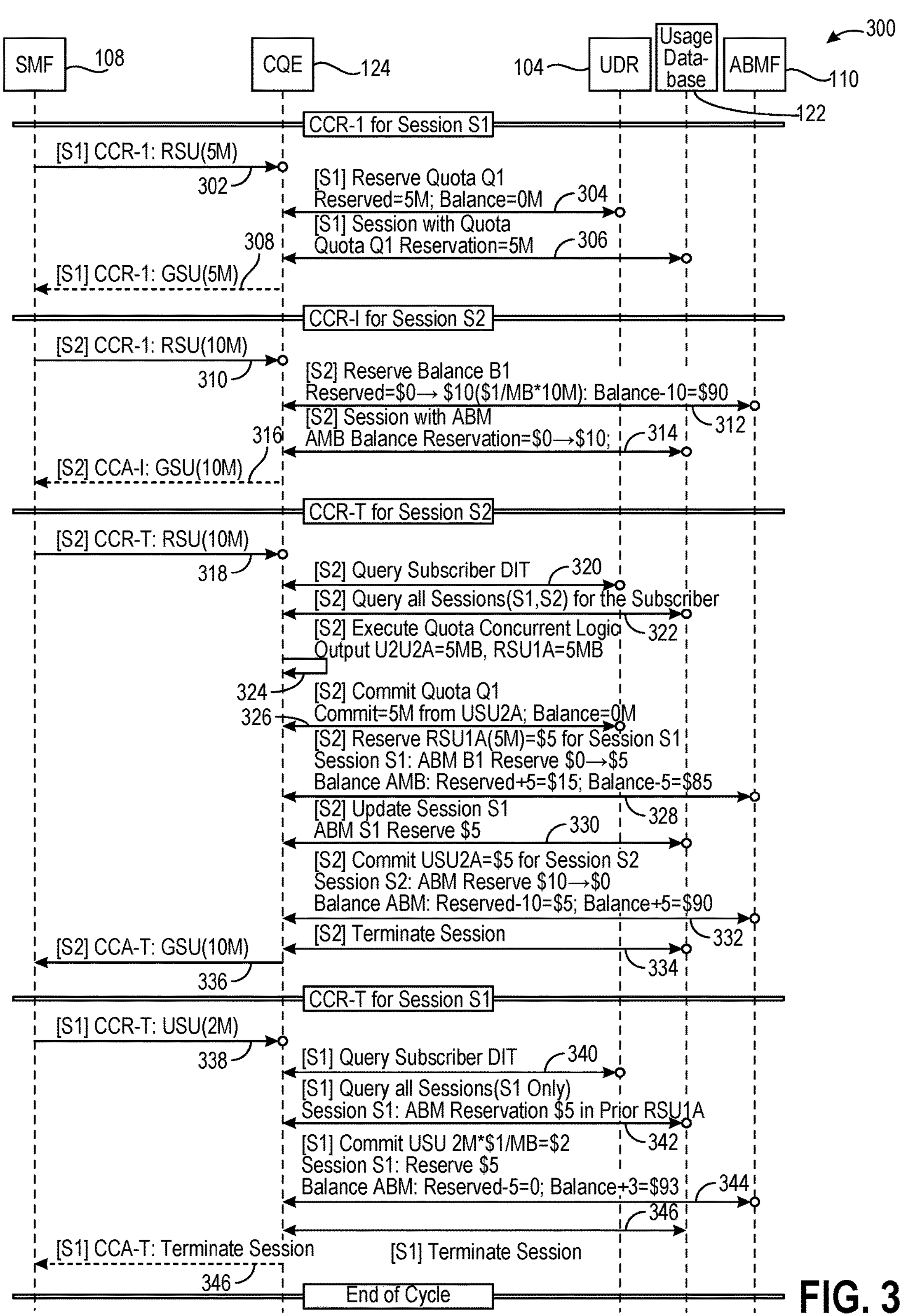
FIG. 3 depicts an illustrative example message flow diagram of operations performed for concurrent resource sharing in accordance with an example implementation disclosed herein.

FIG. 3 depicts an illustrative example message flow diagram of operations performed for concurrent resource sharing in accordance with an example implementation disclosed herein. FIG. 3 depicts a message flow 300 implemented over the environment 100, and thus description of message flow 300 is made with reference to elements of FIG. 1. In the example of FIG. 3, a Diameter Protocol is implemented in which the SMF 108 and CHF 106 exchange messages formatted as Credit Control Request (CCR) messages. In the example implementation of FIG. 3, the resource plan may comprise the following resource plan data: resource quota of 5 MB, a credit balance of $100, once UE is executing two sessions, and the charge rate is $1/MB. Other resource plans may be implemented, and this particular resource plan data is used for illustrative purpose only.

As described above, a UE device sends a first session establishment request message to an SMF 108 via a access network for establishing a first session S1. Based on the first session establishment request message, the SMF 108 sends a CCR-Initial (CCR-1) message 302 to the CQE 124 of a CHF. The CCR-I message 302 includes subscriber identifier information for identifying the resource plan for S1 and a requested service unit (RSU) that represents a first resource request amount for S1. In this example, the RSU for S1 is 5 MB.

At information exchange messages 304, CQE 124 is executed to reserve resource quota based on the CCR-I message 302. For example, the CQE 124 retrieves the resource plan for the subscriber identifier information and determines if resource quota is available to cover the RSU for S1 based on the resource plan data. In this example, there is 5 MB of quota left at this time. As such, CQE 124 reserves 5 MB of the quota for S1 (e.g., a first reserved resource amount), leaving a balance of zero in the resource quota through information exchange messages 304. The CQE 124 registers the reservation for S1 in the session usage database 122 through information exchange messages 306, for example, in a first context may be associated with the subscriber identifier information and stored in session usage database 122. Once the RSU is reserved for S1, the CQE 124 transmits a Credit Control Answer-Initial (CCA-1) message 308 to the SMF 108, including a Granted Service Unit (GSU) that informs the SMF 108 that resources are reserved for S1. Based on CCA-I message 308, SMF 108 establishes the requested first session S1 with the UE device.

At some point later, prior to termination of S1, a UE device 118 (either the same UE device 118 or a different UE device 118) requests a second session (S2) from SMF 108 via a second session establishment request message. Based on the second session establishment request message, the SMF 108 sends a CCR-Initial (CCR-1) message 310 to the CQE 124. The CCR-I message 310 includes subscriber identifier information for identifying the resource plan for S1 and a RSU that represents a second resource request amount for S2. In this example, the RSU for S2 is 10 MB.

At information exchange messages 312, CQE 124 is executed to reserve an amount of credit balance from ABMF 110 (e.g., a second credit amount) based on the RSU of message 310 and the charging rate of the resource plan. For example, as noted above, the reservation of RSU for S1 exhausted the resource quota and, as result, there is no resource quota to cover the RSU for S2. Thus, CQE 124 interacts with ABMF 110 to reserve an amount of the credit balance from the ABMF 110 at information exchange messages 312. This reservation of the second credit amount is registered into the session usage database 122 (e.g., in the first context) via information exchange messages 314. In this example, as noted above, the charging rate is $1/MB, thus the second credit amount is $10. This amount is deducted from the balance leaving $90 of credit balance. Once the RSU is reserved for S2, the CQE 124 transmits a CCA-I message 316 to the SMF 108, including a Granted Service Unit (GSU) that informs the SMF 108 that resources are reserved for S2. Based on CCA-I message 308, SMF 108 establishes the requested second session S1 with the UE device.

At some point later, UE device sends a termination request message to SMF 108 to terminate the second session S2. Based on the request, SMF 108 sends a CCR-Termination (CCR-T) message 318 to the CQE 124. The CCR-T message 318 may include the subscriber identifier information and a Used Service Unit (USU) that indicates an amount of resource actually consumed during the second session S2 (e.g., a resource usage amount for the second session S2). In this example, the USU for S2 is 10 MB. Responsive to message 318, the CQE 124 queries the UDR 104 to retrieve the resource plan for the subscriber identifier information included in termination request message 318 through information exchange messages 320. CQE 124 receives the resource data, including any services quotas (e.g., available resource quotas). CQE 124 also queries the session usage database 122 through information exchange messages 322 to retrieve session usage information for the for the subscriber identifier information included in termination request message 318 (e.g., the first context).

Using the first context, CQE 124 determines if there are any concurrent sessions for the subscriber identifier information at operation 324. In this example, the first context in session usage database 122 includes information indicating that the first session S1 remains on going (e.g., established), and thus is considered to be concurrent with the second session S2. Once concurrent sessions are recognized, CQE 124 determines if an amount of credit balance is reserved for the USU from the first context. In this example, the first context holds the second credit amount indicating that a portion of the credit balance is reserved for S2.

Responsive to this determination, CQE 124 executes the concurrent resource sharing logic at operation 324, as described above in connection with FIG. 2. For example, at operation 324, CQE 124 create a second context as a clone of the first context and registers the second context to session usage database 122. CQE 124 then sets all resource quota reservations to zero. For example, in this example, the reservations for RSU of S1 and the RSU of S2 are set to zero and an interim resource quota is set to 10 MB (e.g., maximum resource quota) CQE 124 then sets an interim USU for S2 (USU2A) to 10 MB and an interim RSU for S1 (RSU1A) to 5M in the second context.

The CQE 124 then rates USU2A of the second context. For example, CQE 124 applies the USU2A to the interim resource quota to reserve resource quota. In this case, the interim resource quota is 5 MB, thus CQE 124 reserves 5 MB of resource quota to cover a portion of the USU2A. Since the interim resource quota is exhausted, CQE 124 then applies the charging rate to the remainder of the USU2A and reserves an interim second credit amount (ABM2A).

At information exchanges messages 326, CQE 124 commits the USU2A to the second session within the UDR 104. The committed amount of resources is deducted from the resource quota stored at the UDR 104. In this example, the resource quota in UDR 104 for the resource plan is exhausted.

CQE 124 then rates the RSU1A (e.g., ongoing concurrent session). In this example, since the interim resource quota is exhausted, CQE 124 applies the charging rate to the remainder of the RSU1A and reserves an interim first credit amount (ABM1A). The CQE 124 then reserves the ABM1A with the ABMF 110 via information message exchange 328 as first credit amount. In this case, AMB1A is $5 (e.g., 5 MB at $1/MB), which shifts the reserved first credit amount from $0 to $5, shifts the total reserved amount to $15, and reduces the credit balance from $90 to $85. CQE 124 then updates the first session S1 in the session usage database 122 (e.g., the second context) at message 330.

At information exchange messages 332, CQE 124 is executed to commit the interim second credit amount (ABM2A) to S2 and update the credit balance. In this example, CQE 124 interacts with ABMF 110 to commit ABM2A (e.g., $5) to the session, which reduces the second credit amount reserved at information exchange messages 314 from $10 to $0 since reserves to cover the USU2A are being committed to the second session. CQE 124 also shifts the credit balance from $85 to $90, for example, by releasing unused reserves back to the credit balance (e.g., releasing $5 of unused second credit amount reserved via message 314).

CQE 124 then sends a termination message to session usage database 122, which registers the second session as terminated and returns a confirmation through information exchange messages 334. At this point, the session S2 may be designated as terminated in the second context. Once terminated in the second context, CQE 124 issues a CCA-T message 336 to the SMF 108 instructing the SMF 108 to terminate the second session S2. The CCA-T message 336 comprises a GSU confirming the resource granted to the session according to the USU included in CCR-T message 318. The GSU in this example is a combination of resources committed from the resource quota and resource committed according to the charging rate applied to the credit balance.

At some point in time later, UE device sends a termination request message to SMF 108 to terminate the second session S1. Based on the request, SMF 108 sends a CCR-T message 338 to the CQE 124. The CCR-T message 338 may include the subscriber identifier information and a USU that indicates an amount of resource actually consumed during the first session S1. In this example, the USU for S1 is 2 MB. Responsive to message 338, the CQE 124 queries the UDR 104 to retrieve the resource plan for the subscriber identifier information included in termination request message 338 through information exchange messages 340. CQE 124 receives the resource data, including any services quotas (e.g., available resource quotas). CQE 124 also queries the session usage database 122 through information exchange messages 342 to retrieve session usage information for the subscriber identifier information included in CCR-T message 338. In some examples, CQE 124 may access the second context, while in other examples the first context may have been updated to reflect the second context resulting at information exchange messages 336. In either case, the context accessed by CQE 124 at information exchange messages 342 includes the reserves for session S1 (e.g., RSU1A and ABM1A). CQE 124 then determines if there are any concurrent sessions from the accessed context. In this example, there are no concurrent sessions as session S2 was previously terminated, as indicated in the context.

CQE 124 then rates the USU for S1. In this example, since the resource quota was exhausted by session S2 previously, the CQE 124 applies the charging rate from the resource plan data to the USU to determine a first credit amount. In this example, the first credit amount is $2 (e.g., 2 MB at $1/MB). Since the first credit amount is less the interim first credit amount (e.g., ABM1A), the CQE 124 commits $2 of the reserved interim first credit amount, shifts the reserved first credit amount from $5 to $0, and releases $3 of the reserved credit amount back to the credit balance, as shown by information exchange messages 344.

CQE 124 sends a termination message to session usage database 122, which registers the second session as terminated and returns a confirmation through information exchange messages 346. At this point, the session S1 may be designated as terminated in the context stored at session usage database 122. Once terminated, CQE 124 issues a CCA-T message 348 to the SMF 108 instructing the SMF 108 to terminate the first session S1. The CCA-T message 348 comprises a GSU confirming the resource granted to the session according to the USU included in CCR-T message 338 and SMF 108 proceeds with terminating the session with the UE device. The GSU in this example is a combination of resources committed according to the charging rate applied to the credit balance.

Accordingly, when the implementation disclosed above are executed, the resource quota can be fully exhausted prior to charging the credit balance. For example, in the above case, the resource quota is exhausted by the second session, even though the resource quota was initially reserved for the first session. Thus, the credit balance need not be charged for usage by the second session prior to committing resources of the resource quota to actual resource usage.

Figure 4:
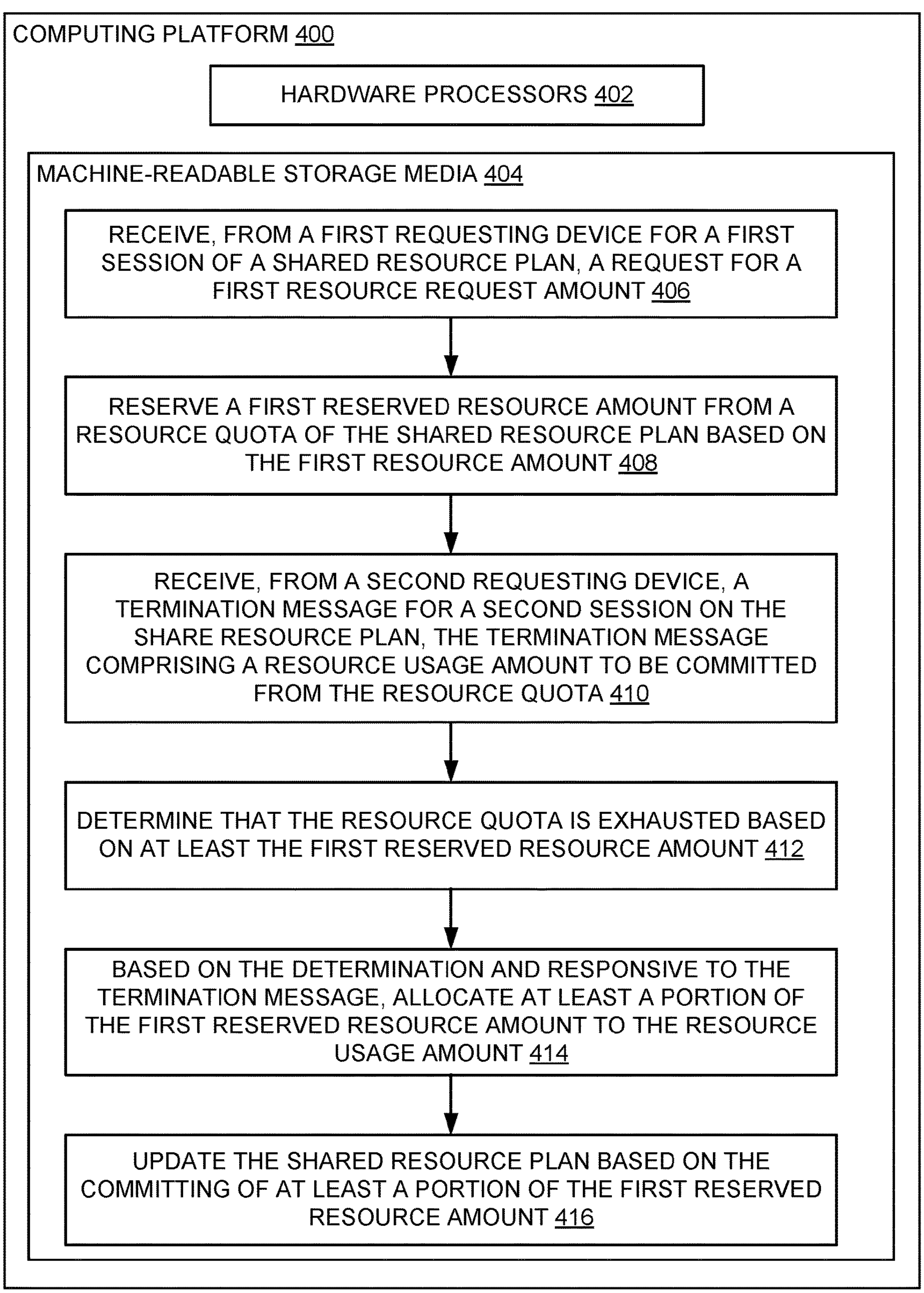
FIG. 4 is an example computing component that may be used to implement various features of concurrent resource sharing in accordance with the implementations disclosed herein.

FIG. 4 illustrates an example computing component that may be used to implement concurrent resource sharing in accordance with various embodiments. Referring now to FIG. 4, computing component 400 may be, for example, a server computer, a controller, or any other similar computing component capable of processing data. In the example implementation of FIG. 4, the computing component 400 includes a hardware processor 402, and machine-readable storage medium 404.

Hardware processor 402 may be one or more central processing units (CPUs), semiconductor-based microprocessors, and/or other hardware devices suitable for retrieval and execution of instructions stored in machine-readable storage medium 404. Hardware processor 402 may fetch, decode, and execute instructions, such as instructions 406-416, to control processes or operations for concurrent resource sharing. As an alternative or in addition to retrieving and executing instructions, hardware processor 402 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 404, may be any electronic, magnetic, optical, or other physical storage device that contains or stores executable instructions. Thus, machine-readable storage medium 404 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 404 may be a non-transitory storage medium, where the term "non-transitory" does not encompass transitory propagating signals. As described in detail below, machine-readable storage medium 404 may be encoded with executable instructions, for example, instructions 406-416.

Hardware processor 402 may execute instruction 406 to receive, from a first requesting device for a first session of a shared resource plan, a request for a first resource request amount.

Hardware processor 402 may execute instruction 408 to reserve a first reserved resource amount from a resource quota of the shared resource plan based on the first resource amount.

Hardware processor 402 may execute instruction 410 to receive, from a second requesting device, a termination message for a second session on the share resource plan, the termination message comprising a resource usage amount to be committed from the resource quota. In some examples, a request for a second resource request amount from the shared resource plan for a second session can be received from the second requesting device. The termination message may be based on the request for the second resource request amount. Further examples are provided in connection with FIGS. 2 and 3 above. The first requesting device is the second requesting device or a different device. Furthermore, the second session may be concurrent with the first session prior to receiving the termination message.

Hardware processor 402 may execute instruction 412 to determine that the resource quota is exhausted based on at least the first reserved resource amount. In some examples, a portion of a credit balance of the shared resource plan can be allocated based on the second resource amount, for example, when the resource quota is exhausted, as explained above in connection with FIGS. 2 and 3.

Hardware processor 402 may execute instruction 414 to, based on the determination and responsive to the termination message, allocate at least a portion of the first reserved resource amount to the resource usage amount. Additionally, in some examples, the allocated portion of the credit balance can be updated based on allocating the at least a portion of the first reserved resource amount to the resource usage amount for the second session. The allocating of the at least a portion of the first reserved resource amount to the resource usage amount can be based on determining the second session is concurrent with the first sessions, for example, as described above in connection with FIGS. 2 and 3.

Hardware processor 402 may execute instruction 414 to update the shared resource plan based on the committing of at least a portion of the first reserved resource amount. Said allocating of at least a portion of the first reserved resource amount to the resource usage amount and said updating the shared resource plan may exhaust the resource quota.

Figure 5:
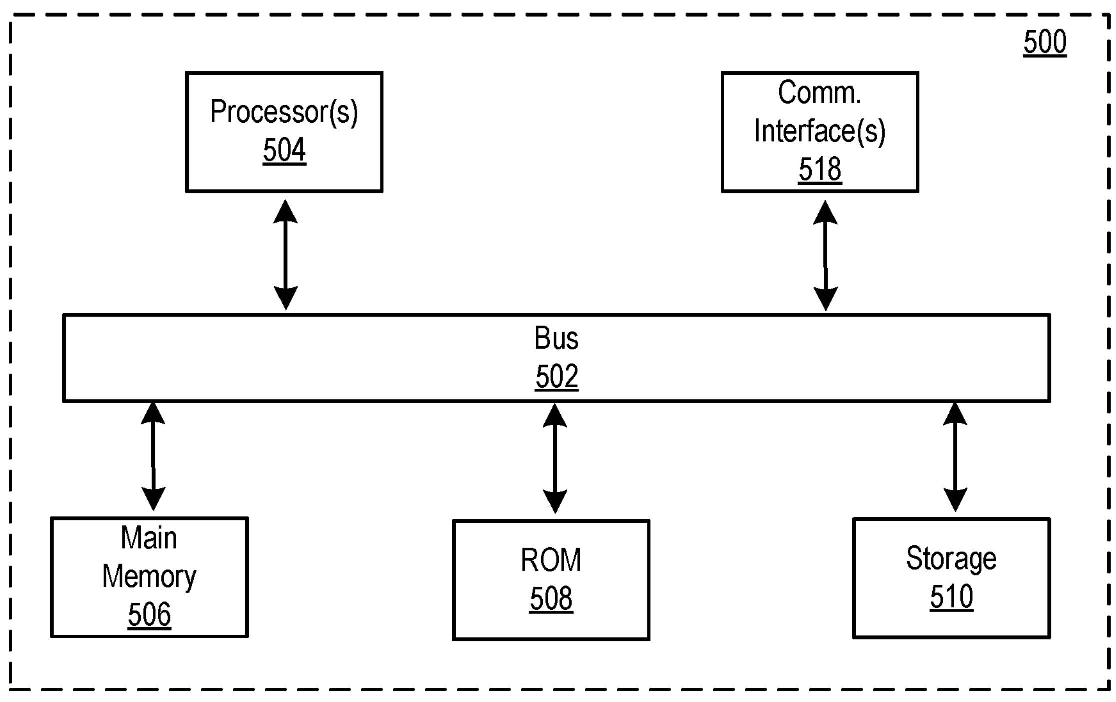
FIG. 5 is an example computer system that may be used to implement various features of concurrent resource sharing of the present disclosure.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors. The computer system 500 may be implemented as any one or more components of communications environment 100, for example, as a UE device 118, CHF 106, SMF 108, UDR 104, ABMF 110, etc.

The computer system 500 also includes a main memory 506, such as a random access memory (RAM), cache and/or other dynamic storage devices, coupled to bus 502 for storing information and instructions to be executed by processor 504. Main memory 506 may also be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. According to various examples, the instructions may include operations and processes described in connection with FIGS. 2, 3, and 4.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry.

The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for concurrent resource sharing, the method comprising:

receiving, from a first requesting device for a first session of a shared resource plan, a request for a first resource request amount;

reserving, for the first session, a first reserved resource amount from a resource quota of the shared resource plan based on the first resource request amount;

receiving, from a second requesting device, a termination message for a second session on the shared resource plan, the termination message comprising a resource usage amount to be committed from the resource quota, wherein the resource usage amount sets forth an amount of resources consumed during the second session;

determining that the resource quota is exceeded based on at least the first reserved resource amount;

based on the determination and responsive to the termination message, allocating at least a portion of the first reserved resource amount reserved for the first session to the resource usage amount of the second session; and updating the shared resource plan based on the allocation of the at least a portion of the first reserved resource amount.

2. The method of claim 1, further comprising:

after receiving the request for a first resource request amount, receiving, from the second requesting device for the second session, a request for a second resource request amount from the shared resource plan, wherein the termination message is based on the request for the second resource request amount.

3. The method of claim 2, further comprising:

allocating a portion of a credit balance of the shared resource plan based on the second request resource amount; and updating the allocated portion of the credit balance based on allocating the at least a portion of the first reserved resource amount to the resource usage amount for the second session.

4. The method of claim 1, wherein the first requesting device is the second requesting device or a different device.

5. The method of claim 1, wherein the second session is concurrent with the first session prior to receiving the termination message.

6. The method of claim 1, wherein the allocating of the at least a portion of the first reserved resource amount to the resource usage amount is based on determining the second session is concurrent with the first session.

7. A system for concurrent resource sharing, the system comprising:

a memory configured to store instructions; and at least one processor communicatively coupled to the memory and configured to execute the instructions to:

receive, from a first requesting device for a first session of a shared resource plan, a request for a first resource request amount;

reserve, for the first session, a first reserved resource amount from a resource quota of the shared resource plan based on the first request resource amount;

receive, from a second requesting device, a termination message for a second session on the share resource plan, the termination message comprising a resource usage amount to be committed from the resource quota, determine that the resource quota is exceeded based on at least the first reserved resource amount;

based on the determination and responsive to the termination message, allocate least a portion of the first reserved resource amount reserved for the first session to the resource usage amount of the second session; and update the shared resource plan based on the allocation of the at least a portion of the first reserved resource amount.

8. The system of claim 7, wherein the at least one processor is further configured to:

after receiving the request for a first resource request amount, receive, from the second requesting device for the second session, a request for a second resource request amount from the shared resource plan, wherein the termination message is based on the request for the second resource request amount.

9. The system of claim 8, wherein the at least one processor is further configured to:

allocate a portion of a credit balance of the shared resource plan based on the second request resource amount; and update the allocated portion of the credit balance based on committing the at least a portion of the first reserved resource amount to the resource usage amount for the second session.

10. The system of claim 7, wherein the first requesting device is the second requesting device or a different device.

11. The system of claim 7, wherein the second session is concurrent with the first session prior to receiving the termination message.

12. The system of claim 7, wherein the allocating of the at least a portion of the first reserved resource amount to the resource usage amount is based on determining the second session is concurrent with the first session.

13. A non-transitory computer-readable storage medium storing instructions that, when executed by a processor, cause the processor to perform a method comprising:

receiving a request to terminate a first session on a resource plan, the request comprising information indicative of an amount of resources consumed during the first session;

responsive to the request, determining that the first session is concurrent with a second session on the resource plan, wherein an amount of resource reserved from a resource quota of the resource plan is reserved to the second session prior to receiving the request to terminate the first session;

based on the determination, executing a concurrent resource sharing logic that shifts the amount of resources reserved for the second session to the amount of resources consumed during the first session; and terminating the first session based on the amount of resource reserved shifted to the first session.

14. The non-transitory medium of claim 13, wherein the method further comprises:

receiving, from a first requesting device, a request for a first resource request amount for the second session; and reserving the amount of resources from the resource quota based on the first resource request amount.

15. The non-transitory medium of claim 14, wherein the method further comprises:

after receiving the request for the first resource request amount, receiving, from a second requesting device for the first session, a request for a second resource request amount from the resource plan, wherein the request to terminate the first session is based on the request for the second resource request amount.

16. The non-transitory medium of claim 15, wherein the method further comprises:

allocating a portion of a credit balance of the resource plan based on the second resource amount; and updating the allocated portion of the credit balance based on the shifting of the amount of resources reserved for the second session to the first session.

17. The non-transitory medium of claim 16, wherein the method further comprises:

reserving a portion of the credit balance for the second session based on the shifting of the amount of resources reserved for the second session to the first session.

18. The non-transitory medium of claim 15, wherein the first requesting device is the second requesting device or a different device.

19. The non-transitory medium of claim 13, wherein the method further comprises:

updating the resource plan based on the shifting of the amount of resources reserved for the second session to the first session, wherein said shifting and said updating provides for exhausting the resource quota.

20. The non-transitory medium of claim 13, wherein the method further comprises:

determining that the resource quota is exceeded based on at least amount of resource reserved for the second session; and wherein the concurrent resource sharing logic is executed based on the determination that the resource quota is exceeded based on at least amount of resource reserved for the second session.

* * * * *